United States Patent
Rajauria et al.

(10) Patent No.: US 9,947,346 B2
(45) Date of Patent: Apr. 17, 2018

(54) USING WINDOW UNDERLAYER STRUCTURES TO PROTECT NEAR FIELD TRANSDUCERS ON HEAT ASSISTED MAGNETIC RECORDING HEADS

(71) Applicant: HGST Netherlands B.V., Amsterdam (NL)

(72) Inventors: Sukumar Rajauria, San Jose, CA (US); Robert Smith, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 71 days.

(21) Appl. No.: 15/085,875

(22) Filed: Mar. 30, 2016

(65) Prior Publication Data
US 2017/0287511 A1 Oct. 5, 2017

(51) Int. Cl.
| | |
|---|---|
| G11B 5/127 | (2006.01) |
| G11B 5/31 | (2006.01) |
| G11B 5/48 | (2006.01) |
| G11B 5/60 | (2006.01) |
| G11B 5/40 | (2006.01) |
| G11B 5/00 | (2006.01) |

(52) U.S. Cl.
CPC .......... G11B 5/314 (2013.01); G11B 5/40 (2013.01); G11B 5/4866 (2013.01); G11B 5/6088 (2013.01); *G11B 2005/0021* (2013.01)

(58) Field of Classification Search
None
See application file for complete search history.

(56) References Cited

U.S. PATENT DOCUMENTS

| | | |
|---|---|---|
| 6,999,384 B2 | 2/2006 | Stancil et al. |
| 8,208,350 B1 | 6/2012 | Hu et al. |
| 8,565,049 B1 | 10/2013 | Tanner et al. |
| 8,649,245 B2 | 2/2014 | Goulakov et al. |
| 8,902,720 B1 | 12/2014 | Schreck et al. |
| 8,971,160 B1 | 3/2015 | Yuan et al. |
| 9,036,307 B1 | 5/2015 | Hoshiya et al. |

FOREIGN PATENT DOCUMENTS

WO 2014197190 A1 12/2014

OTHER PUBLICATIONS

Xu et al., "Dynamic Thermal Responses of Heat-Assisted Magnetic Recording Head in Data Writing Process," IEEE Transactions on Magnetics, vol. 48, No. 11, Nov. 2012, pp. 3280-3283.

*Primary Examiner* — Brian Butcher
(74) *Attorney, Agent, or Firm* — Foley & Lardner LLP (57) ABSTRACT

A system, according to one embodiment, includes: a near field transducer, a return pole, a main pole, a waveguide adjacent the near field transducer, wherein the waveguide extends away from the near field transducer along a direction perpendicular to a media facing surface, at least one cladding layer adjacent to the waveguide, an underlayer positioned behind the near field transducer with respect to the media facing surface, the underlayer extending away from the near field transducer along the direction perpendicular to the media facing surface, and a fill material at least partially surrounding the underlayer, the waveguide and the at least one cladding layer. The underlayer has a lower coefficient of thermal expansion than the fill material. Other systems, and methods are described in additional embodiments.

18 Claims, 6 Drawing Sheets

FIG. 1

PRIOR ART

USING WINDOW UNDERLAYER STRUCTURES TO PROTECT NEAR FIELD TRANSDUCERS ON HEAT ASSISTED MAGNETIC RECORDING HEADS

FIELD OF THE INVENTION

The present invention relates to data storage systems, and more particularly, this invention relates to heat assisted magnetic recording write heads having improved near field transducer (NFT) structure protection during use and methods for making the same.

BACKGROUND OF THE INVENTION

The heart of a computer is a magnetic disk drive which typically includes a rotating magnetic disk, a slider that has read and write heads, a suspension arm above the rotating disk and an actuator arm that swings the suspension arm to place the read and/or write heads over selected data tracks on the rotating disk. The suspension arm biases the slider into contact with the surface of the disk when the disk is not rotating (in some disk drives, there is a load/unload ramp so contact with the disk does not occur); but, when the disk rotates, air is swirled by the rotating disk adjacent a media facing surface of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The ongoing quest for higher storage bit densities in magnetic media used in disk drives has reduced the size (volume) of data cells to the point where the cell dimensions are limited by the grain size of the magnetic material. Although grain size can be reduced further, there is concern that data stored within the cells is no longer thermally stable, as random thermal fluctuations at ambient temperatures are sufficient to erase data. This state is described as the superparamagnetic limit, which determines the maximum theoretical storage density for a given magnetic medium. This limit may be raised by increasing the coercivity of the magnetic medium or lowering the temperature. Lowering the temperature is not a practical option when designing hard disk drives for commercial and consumer use. Raising the coercivity is a practical solution, but requires write heads employing higher magnetic moment materials which will make data recording more challenging.

One solution has been proposed, which employs heat to lower the effective coercivity of a localized region on the magnetic medium surface and writes data within this heated region. The data state becomes "fixed" upon cooling the medium to ambient temperatures. This technique is broadly referred to interchangeably as "heat assisted magnetic recording", HAMR, or "thermally assisted (magnetic) recording", TAR or TAMR. HAMR can be applied to both longitudinal and perpendicular recording systems, although the highest density state of the art storage systems are more likely to be perpendicular recording systems. Heating of the media surface has been accomplished by a number of techniques such as focused laser beams or near field optical sources. U.S. Pat. No. 6,999,384 to Stancil et al., which is herein incorporated by reference, discloses near field heating of a magnetic medium.

The heat used in HAMR is provided by a plasmonic nanostructure, namely an NFT, which locally elevates a limited spot on the medium to its Curie temperature of about 600° C. Thus, the thermal and mechanical reliability of the NFT is important. However, the thermo-mechanical response of the NFT when exposed to such high temperatures leads to an undesirable protrusion of the plasmonic structure, thereby making the NFT the minimum fly point over the medium. This increases the risk of damage to the NFT resulting from disk contact during touchdown and the presence of high thermal asperities during back-off operations. However, previous attempts to protect NFTs from such damage have been unable to do so with a desired amount of efficiency.

SUMMARY

A system, according to one embodiment, includes: a near field transducer, a return pole, a main pole, a waveguide adjacent the near field transducer, wherein the waveguide extends away from the near field transducer along a direction perpendicular to a media facing surface, at least one cladding layer adjacent to the waveguide, an underlayer positioned behind the near field transducer with respect to the media facing surface, the underlayer extending away from the near field transducer along the direction perpendicular to the media facing surface, and a fill material at least partially surrounding the underlayer, the waveguide and the at least one cladding layer. The underlayer has a lower coefficient of thermal expansion than the fill material.

A method, according to another embodiment, includes: applying light to a near field transducer positioned toward a media facing surface of a magnetic head, the magnetic head having: a return pole, a main pole, a waveguide adjacent the near field transducer, wherein the waveguide extends away from the near field transducer along a direction perpendicular to the media facing surface, at least one cladding layer adjacent to the waveguide, an underlayer positioned behind the near field transducer with respect to the media facing surface, the underlayer extending away from the near field transducer along the direction perpendicular to the media facing surface, and a fill material at least partially surrounding the underlayer, the waveguide and the at least one cladding layer. The underlayer has a lower coefficient of thermal expansion than the fill material. Moreover, upon illumination of the near field transducer, a portion of the media facing surface of the magnetic head at the near field transducer exhibits less thermal protrusion toward a magnetic medium than another portion of the media facing surface.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof. Various embodiments described herein may be able to provide added protection for an NFT. By selectively implementing underlayers having certain properties, some of the embodiments described herein may be able to prevent an NFT from becoming the minimum fly point over the medium, thereby desirably providing greater reliability during recording, as will be described in further detail below.

In one general embodiment, a system includes: a near field transducer, a return pole, a main pole, a waveguide adjacent the near field transducer, wherein the waveguide extends away from the near field transducer along a direction perpendicular to a media facing surface, at least one cladding layer adjacent to the waveguide, an underlayer positioned behind the near field transducer with respect to the media facing surface, the underlayer extending away from the near field transducer along the direction perpendicular to the media facing surface, and a fill material at least partially surrounding the underlayer, the waveguide and the at least one cladding layer. The underlayer has a lower coefficient of thermal expansion than the fill material.

In another general embodiment, a method includes: applying light to a near field transducer positioned toward a media facing surface of a magnetic head, the magnetic head having: a return pole, a main pole, a waveguide adjacent the near field transducer, wherein the waveguide extends away from the near field transducer along a direction perpendicular to the media facing surface, at least one cladding layer adjacent to the waveguide, an underlayer positioned behind the near field transducer with respect to the media facing surface, the underlayer extending away from the near field transducer along the direction perpendicular to the media facing surface, and a fill material at least partially surrounding the underlayer, the waveguide and the at least one cladding layer. The underlayer has a lower coefficient of thermal expansion than the fill material. Moreover, upon illumination of the near field transducer, a portion of the media facing surface of the magnetic head at the near field transducer exhibits less thermal protrusion toward a magnetic medium than another portion of the media facing surface.

Figure 1:
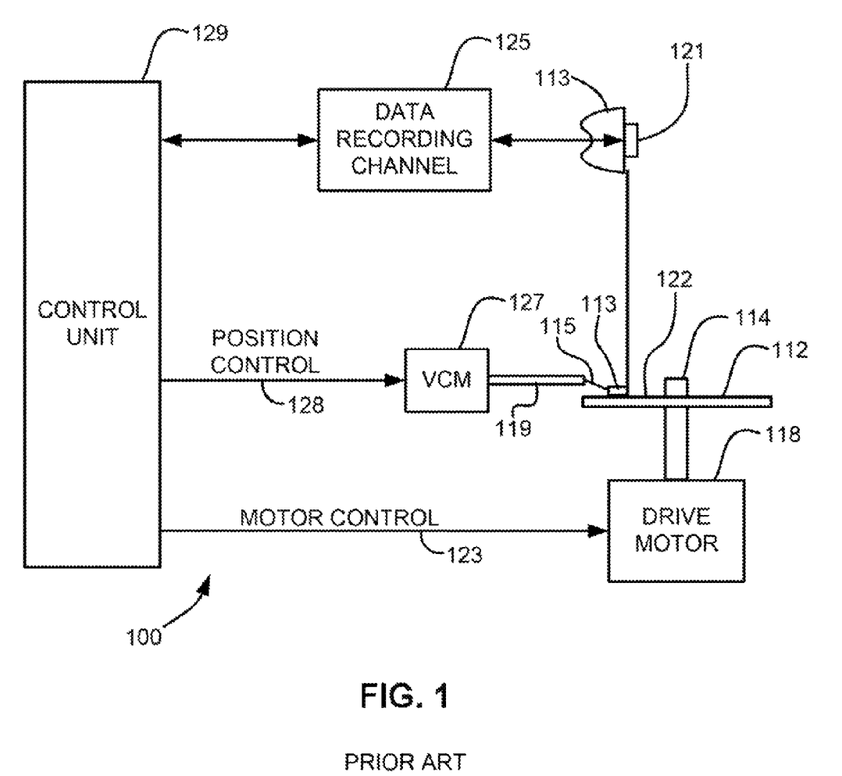
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121 (e.g., of a magnetic head). As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

Figure 5A:
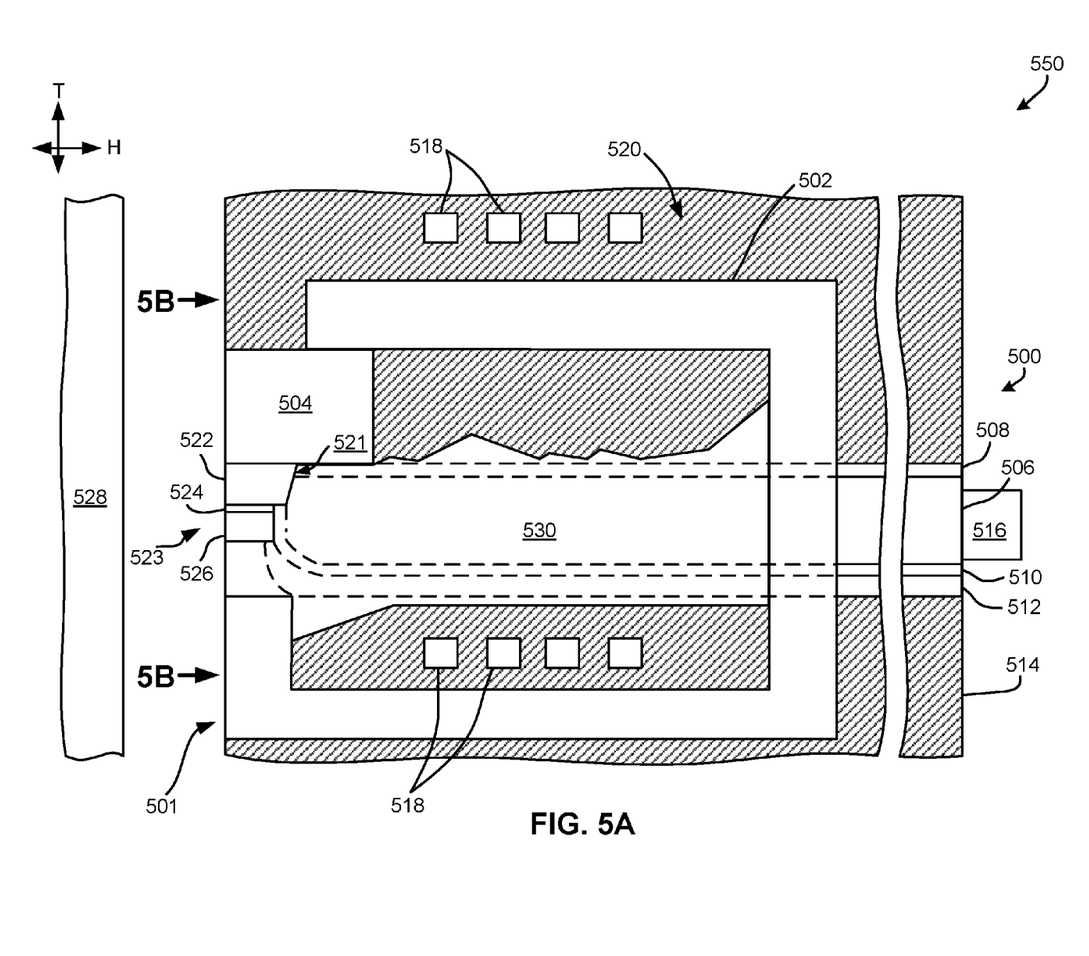
FIG. 5A is a partial cross sectional view of a thin film perpendicular write head according to one embodiment.

In some embodiments, the disk drive 100 of FIG. 1 may be implemented for HAMR. Accordingly, the disk drive 100 may include an apparatus, e.g., see 500 of FIG. 5. Thus, the read/write heads 121 of the disk drive 100 may operate in combination with an NFT as described in detail below.

With continued reference to the disk drive 100 of FIG. 1, an interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers of the write portion by a gap layer at or near a media facing surface of the head (sometimes referred to as an air bearing surface in a disk drive). The pole piece layers may be connected at a back gap. Currents are conducted through the coil layer, which produce magnetic fields in the pole pieces. The magnetic fields fringe across the gap at the media facing surface for the purpose of writing bits of magnetic field information in tracks on moving media, such as in circular tracks on a rotating magnetic disk.

The second pole piece layer has a pole tip portion which extends from the media facing surface to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 2A:
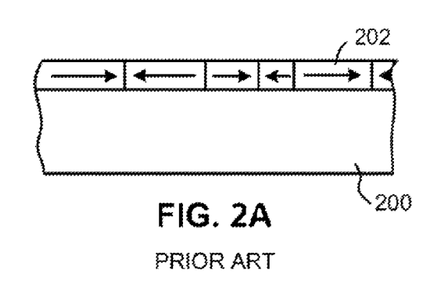
FIG. 2A is a schematic representation in section of a recording medium utilizing a longitudinal recording format.

FIG. 2A illustrates, schematically, a conventional recording medium such as used with magnetic disk recording systems, such as that shown in FIG. 1. This medium is utilized for recording magnetic domains in or parallel to the plane of the medium itself. The recording medium, a recording disk in this instance, comprises basically a supporting substrate 200 of a suitable non-magnetic material such as glass, with an overlying coating 202 of a suitable and conventional magnetic layer.

Figure 2B:
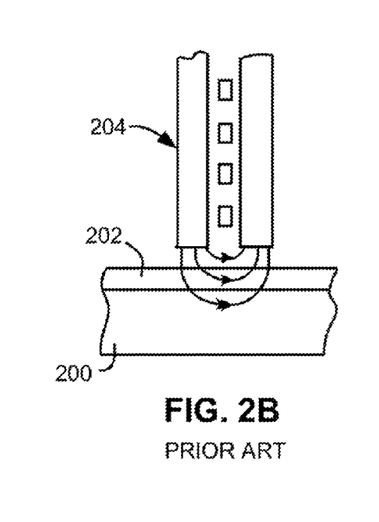
FIG. 2B is a schematic representation of a conventional magnetic recording head and recording medium combination for longitudinal recording as in FIG. 2A.

FIG. 2B shows the operative relationship between a conventional recording head 204, which may preferably be a thin film head, and a longitudinal recording medium, such as that of FIG. 2A.

Figure 2C:
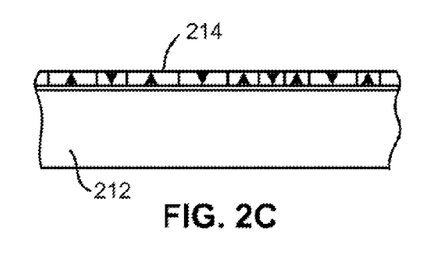
FIG. 2C is a magnetic recording medium utilizing a perpendicular recording format.

FIG. 2C illustrates, schematically, a perpendicular recording head where, the orientation of magnetic domains substantially perpendicular to the surface of a recording medium as used with magnetic disk recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

Figure 2D:
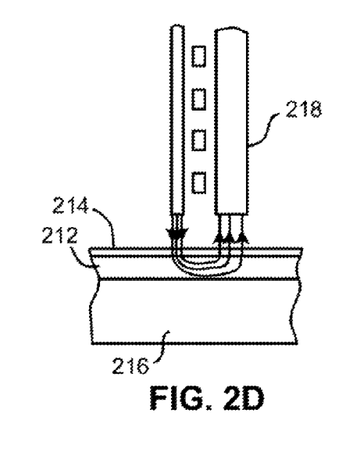
FIG. 2D is a schematic representation of a recording head and recording medium combination for perpendicular recording on one side.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic domains having their axes of magnetization substantially perpendicular to the surface of the medium. The flux is channeled by the soft underlying coating 212 back to the return pole of the head 218.

Figure 2E:
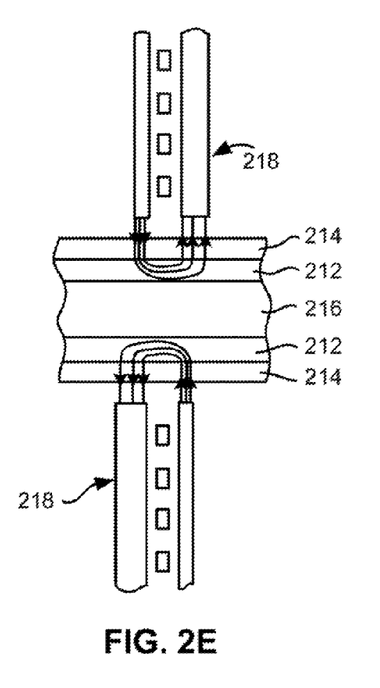
FIG. 2E is a schematic representation of a recording apparatus adapted for perpendicular recording separately on both sides of the medium.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

Figure 3A:
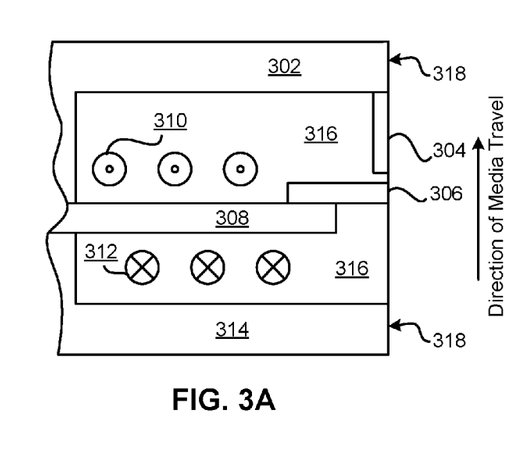
FIG. 3A is a cross-sectional view of one particular embodiment of a perpendicular magnetic head with helical coils.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the media facing surface 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the media facing surface 318. The media facing surface 318 is indicated across the right side of the structure.

Perpendicular writing is achieved by forcing flux through the stitch pole 308 into the main pole 306 and then to the surface of the disk positioned toward the media facing surface 318.

Figure 3B:
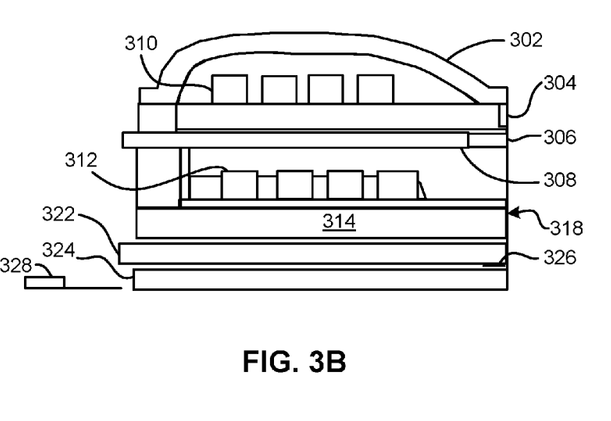
FIG. 3B is a cross-sectional view of one particular embodiment of a piggyback magnetic head with helical coils.

FIG. 3B illustrates a piggyback magnetic head having similar features to the head of FIG. 3A. Shield 304 and return pole 314 flank the stitch pole 308 and main pole 306. Also sensor shields 322, 324 are shown. The read sensor 326 is typically positioned between the sensor shields 322, 324.

Figure 4A:
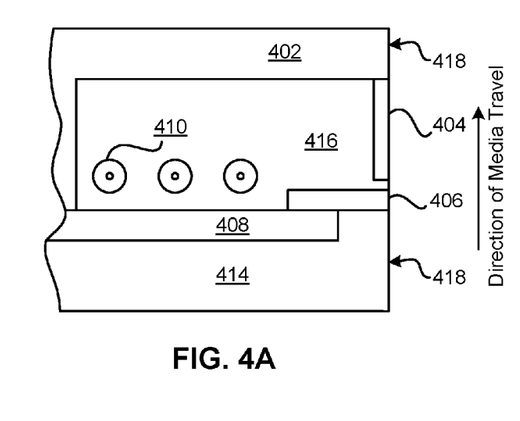
FIG. 4A is a cross-sectional view of one particular embodiment of a perpendicular magnetic head with looped coils.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the media facing surface 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the media facing surface 418). The media facing surface 418 is indicated across the right side of the structure. The trailing shield 404 may be in contact with the main pole 406 in some embodiments.

Figure 4B:
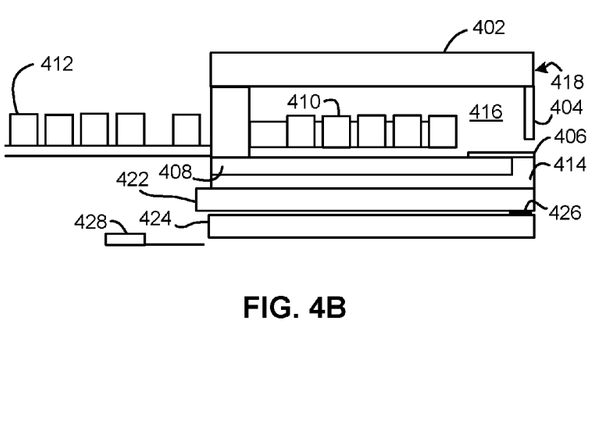
FIG. 4B is a cross-sectional view of one particular embodiment of a piggyback magnetic head with looped coils.

FIG. 4B illustrates another type of piggyback magnetic head having similar features to the head of FIG. 4A including looped coils 410, which loops around to form looped coils 412. Also, sensor shields 422, 424 are shown, with the upper sensor shield 422 spaced from the writer by a non-magnetic layer 414. The sensor 426 is typically positioned between the sensor shields 422, 424.

In FIGS. 3B and 4B, an optional heater 328, 428, respectively, is shown away from the media facing surface of the magnetic head. A heater 328, 428 may also be included in the magnetic heads shown in FIGS. 3A and 4A. The position of this heater may vary based on design parameters such as where the protrusion is desired, coefficients of thermal expansion of the surrounding layers, etc.

As previously mentioned, HAMR, or equivalently TAR, is a method of recording information onto a magnetic recording medium. One general motivation for this invention relates to the design of a recessed dielectric waveguide and integration with a near-field optical transducer for HAMR. The waveguide core may be optimally recessed by a distance from the transducer and this space may be filled with low index dielectric material, leading to significant enhancement of the optical efficiency. In one preferred embodiment, the low index dielectric material in the recessed space may be deposited after fabrication of the near-field transducer using an anisotropic deposition followed by deposition of the high index core material.

According to some embodiments, for HAMR to be effective, it may be beneficial to confine heat to about a single data track which may be approximately 40 nm wide or smaller. Candidate near-field optical sources typically use a low-loss metal (Au, Ag, Al, Cu, etc.) shaped in such a way as to concentrate surface charge motion at a tip apex located at the slider media facing surface when light is incident. Oscillating tip charge may create an intense near-field pattern, heating the disk. Sometimes, the metal structure can create resonant charge motion (surface plasmons) to further increase intensity and disk heating. For example, when polarized light is aligned with the corner of a triangular-shaped gold plate, an intense near field pattern may be created at that corner. Resonant charge motion may occur by adjusting the triangle size to match a surface plasmon frequency to the incident light frequency. Another near-field transducer is the notch slot waveguide from microwave circuits applied to optical frequencies (also known as the C aperture). Light polarization may be aligned with the notch and incident light may concentrate surface charge at the tip of the notch.

However, the thermo-mechanical response of the NFT when exposed to such high temperatures has previously led to an undesirable protrusion of the plasmonic structure, thereby causing the NFT to become the minimum fly point over the medium. This increases the risk of damage to the NFT resulting from disk contact during touchdown and the presence of high thermal asperities during back-off operations. Thus, although minimal clearance (e.g., sub-nanometer clearance) between the head and disk is desired for high areal density in HAMR HDDs, large variations in NFT protrusion during operation has made clearance management for previous attempts very difficult.

Previous attempts to protect the NFT against such damage resulting from interaction between the NFT and the medium have been unable to do so with a desired amount of efficiency. For instance, attempts to preemptively recess the NFT from the media facing surface of a head have proven to be difficult to control due to thermal oxidation. Moreover, recessing the NFT undesirably results in requiring higher operating power to generate sufficient heat at the medium. In other instances, attempts have been made to implement a passive protection pad to prevent a protruded NFT from contacting the medium. However, the extent to which an NFT protrudes varies greatly during use, thereby making the passive protection pad potentially less effective.

In sharp contrast, various embodiments described herein prevent an NFT from becoming the minimum fly point over the medium during operation, thereby desirably providing greater reliability during recording. According to some approaches, NFT protrusion may be reduced by selectively implementing underlayers having reduced coefficients of thermal expansion, as will be described in further detail below.

FIG. 5A depicts a partial cross sectional view of a system 550 having a magnetic HAMR head 500, in accordance with one embodiment. As an option, the present head 500 may be implemented in conjunction with features from any other embodiment listed herein, such as those described with reference to the other FIGS. Of course, however, such head 500 and others presented herein may be used in various applications and/or in permutations which may or may not be specifically described in the illustrative embodiments listed herein. Further, the head 500 presented herein may be used in any desired environment.

It should be noted that the dimensions of the components illustrated in FIG. 5A may be exaggerated (e.g., larger than would typically be observed) relative to other components, which are in no way intended to limit the invention. Moreover, to simplify and clarify the structures presented, and spacing layers, insulating layers may be omitted from the subsequent figures and/or descriptions. Thus, although FIG. 5A illustrates an illustrative cross sectional view of a magnetic HAMR head 500, additional and/or alternative layers and combinations of layers may be used in the structure as would be appreciated by one of ordinary skill in the relevant art upon reading the present disclosure, including insulating layers, adhesion layers, etc. In addition, any of the layers described in relation to head 500 may be comprised of multiple layers, which may or may not be of the same material.

Referring now to FIG. 5A, the head 500 includes a return pole 502 which is coupled to the main pole 504, a portion of the main pole 504 being positioned at the media facing surface. The return pole 502 may include a conventional magnetic alloy or material. Exemplary materials for the return pole 502 include Co, Ni, Fe, Cr etc. and/or combinations thereof. Moreover, the main pole 504 may include any known suitable material, such as NiFe, CoFe, CoNiFe, CoFeCr etc.

The head 500 also includes an optical waveguide 506, surrounded by cladding layers 508, 510, 512. In various embodiments, the cladding layers 508, 510, 512 may include any material which would be apparent to one of ordinary skill in the art, such as $Al_2O_3$, $SiO_2$, etc., and/or their composites. Moreover, the cladding layers 508, 510, 512 may include same, similar or different materials, depending on the desired embodiment.

According to the present embodiment, optical waveguide 506 and cladding layers 508, 510, 512 are adjacent the NFT 523 which is positioned toward a media facing surface 501 of the head 500. As shown, cladding layers 508, 510, 512 are adjacent to the waveguide 506 and the waveguide 506 is positioned behind a side of the NFT 523 farthest from the media facing surface. However, in other embodiments, the waveguide 506 and/or cladding layers 508, 510, 512 may be offset from the NFT 523 in the track direction T, e.g., for embodiments having a nanobeak antenna as would be appreciated by one skilled in the art upon reading the present description.

Moreover, the waveguide 506 and cladding layers 508, 510, 512 extend away from the NFT 523 along a direction H perpendicular to the media facing surface 501. It should be noted that although three cladding layers are shown in the present embodiment, any number of cladding layers may be included, but preferably at least one cladding layer is included.

In some approaches, the optical waveguide 506 may be spaced from the NFT by between about 100 nm and about 10 nm, but may be higher or lower depending on the desired embodiment. One of the cladding layers 510 forms a recess between the waveguide 506 and the NFT 523. Further, cladding layer 510 is also directly adjacent a side of the waveguide 506, e.g., extending parallel to a longitudinal axis of the waveguide 506 in the height direction H (a direction perpendicular to the media facing surface 501). Additionally, another one of the cladding layers 512 extends along a leading edge side of the NFT 523, thereby forming a portion of the media facing surface. Thus, in some embodiments, the waveguide 506 may be positioned adjacent two cladding layers 510, 512, e.g., as illustrated in FIG. 5A.

Optical waveguide 506 preferably extends to the flex side 514 as indicated by the dashed lines. Moreover, the cladding layers 508, 510, 512 are illustrated as extending to at least the flex side 514; although in other embodiments, some or all of the cladding layers may not extend to the flex side 514. The waveguide 506 extends to the flex side 514 having a near field optical source 516, e.g., a laser. The optical source 516 emits light, e.g., an optical signal, which is desirably directed along the optical waveguide 506, toward the NFT 523. Thus the waveguide 506 is generally used to deliver light energy to the NFT which creates a small hot-spot on the surface of the medium 528, thereby inducing isolated heating of the medium 528 surface. The waveguide 506 preferably includes a material having a high refractive index (e.g., at least higher than the cladding layers 508, 510, 512), thereby assisting in keeping the optical signal, emitted from the optical source 516, within the waveguide 506. Illustrative materials for the waveguide 506 include, but are not limited to, $TaO_x$, $TiO_x$, $NbO_x$, $ZrO_x$, $HfO_x$, etc., and/or their composites. Other exemplary materials for the waveguide 506 may include $Ta_2O_5$, and/or $TiO_2$.

The cladding layers 508, 510, 512 preferably include a material having a low refractive index, e.g., so as to keep the optical signal confined within the sidewalls of the waveguide. In general, a low refractive index material may include any material having refractive index below about 1.75, but could be higher or lower depending on the desired embodiment. In other approaches, the low refractive index may be lower than the refractive index of the waveguide 506. Illustrative materials for the cladding layers 508, 510, 512 include refractive oxides such as $AlO_x$, $SiO_x$, etc. or other conventional materials having a desirably low refractive index.

As shown, the waveguide 506 may have an approximately uniform cross section along its length. The thickness of the waveguide 506 may be nominally between about 200 nm and about 400 nm, but is preferably thicker than the aperture 524.

However, as well known in the art, the waveguide 506 may have a number of other possible designs including a planar solid immersion mirror or planar solid immersion lens which have a non-uniform core cross section along the waveguide's length. Thus, according to various approaches, the waveguide 506 may have any other cross sectional profile as selected by one of ordinary skill in the relevant art, such as a rectangular, square, triangular, circular, etc., cross section.

With continued reference to FIG. 5A, the head 500 also includes write coils 518 positioned in a fill material 520, e.g., which may be a conventional insulation layer such as alumina. As would be appreciated by one skilled in the art, the write coils may assist the head 500 in performing write operations by inducing a magnetic field in the return pole 502 which is transferred to the main pole 504 and concentrated in a magnetic lip 522 which is used to write to a magnetic medium 528 (e.g., a magnetic disk) spaced therefrom. In other words, the magnetic lip 522 may serve as a write pole. Thus, the magnetic lip 522 is preferably magnetically coupled to the main pole 504, and the return pole 502. In other embodiments, the main pole 504 may have a step formed near the lower portion of the main pole 504.

It is also preferred that the magnetic lip 522 has a straight and substantially vertical (perpendicular to the plane of deposition) back edge 521, e.g., farthest from the media facing surface of the head 500. Various methods of forming the magnetic lip 522 capable of achieving a substantially vertical back edge 521 may be implemented to manufacture head 500, as would be appreciated by one skilled in the art upon reading the present description.

Additionally, the NFT 523 is illustrated in the present embodiment as including an aperture 524 (e.g., a C aperture) and a conductive metal film main body 526 therebelow, which is in no way intended to limit the invention. Rather, it should be noted that NFT 523 may be of any conventional design, such as an E-antenna, a lollipop, triangular, nanobeak, etc. According to one approach, the aperture 524 may include $SiO_2$.

Figure 5B:
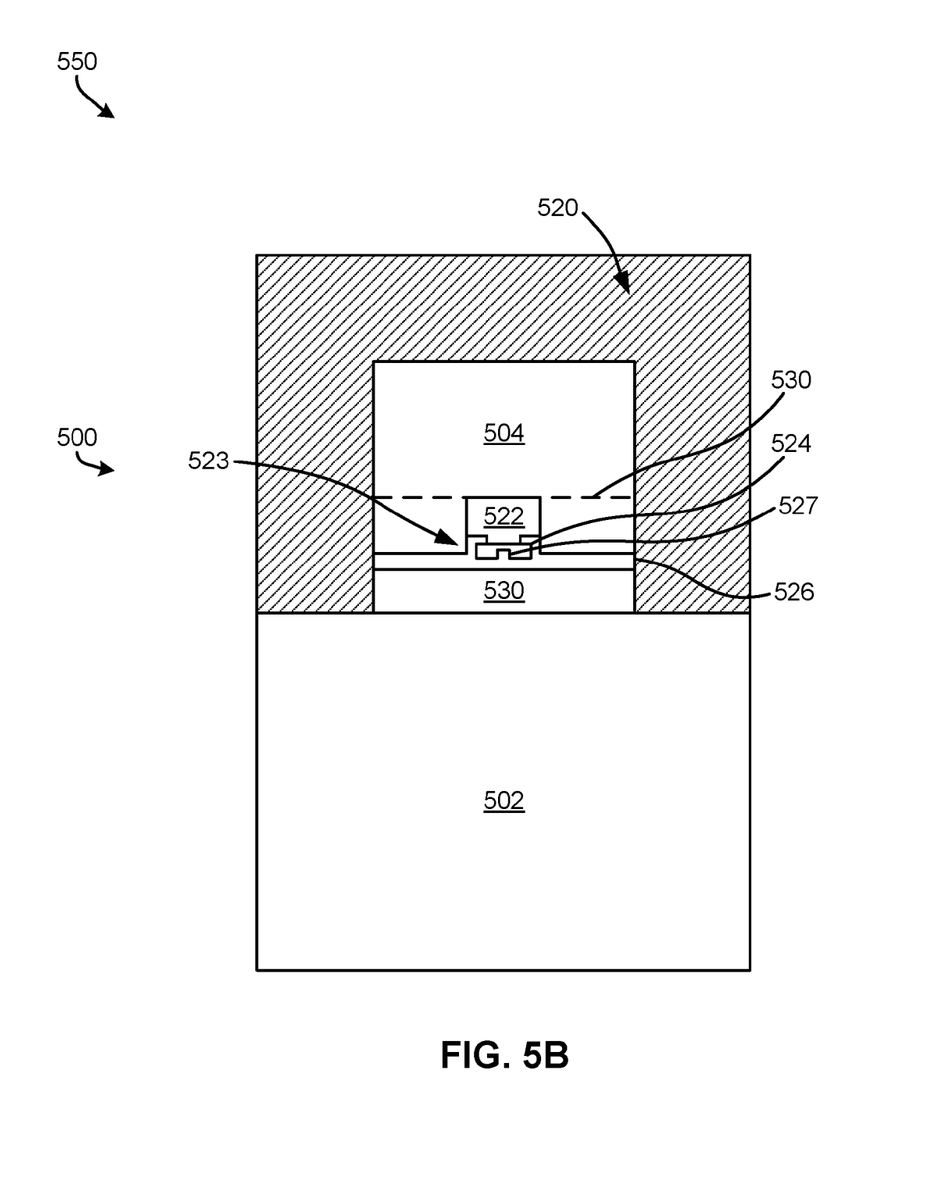
FIG. 5B is a partial media facing surface view of the head of FIG. 5A taken along 5B-5B.

Looking to the media facing surface view in FIG. 5B, the main body 526 is shown as having a notch 527 extending therefrom. The aperture 524 is illustrated as having a "C-shaped" structure, formed by the conductive metal film main body 526 and notch 527 therebelow. However, depending on the desired embodiment, the conductive metal film main body 526 may have any shape. According to one example, the conductive metal film main body 526 may have a circular cross sectional shape with a notch extending therefrom, e.g., as would be appreciated by one skilled in the art as a "lollipop antenna." It follows that the NFT 523 may be part of an E-antenna, a nanobeak antenna, a lollipop antenna, etc., depending on the desired embodiment.

It follows that the partial cross sectional view of the head 500 in FIG. 5A and the media facing surface view of the head 500 shown in FIG. 5B are in no way meant to limit the structure of the NFT as described herein. Moreover, the process of forming an exemplary NFT structure may include conventional processes which would be apparent to one skilled in the art upon reading the present description.

Referring still to FIG. 5A, the aperture 524 and conductive metal film main body 526 of the NFT 523 may be used to assist in performing write operations. As described above, an NFT may be used to heat the magnetic medium, thereby softening the magnetic stability of the magnetic grains thereof. The energy to heat the magnetic medium may be supplied to the NFT 523 from the optical source 516 via the waveguide 506. In preferred embodiments, this allows for the magnetic field concentrated at the magnetic lip 522 to influence the magnetic orientation of the magnetic grains on the medium 528, e.g., to perform a write operation. Therefore, it is desirable that the NFT is located adjacent the magnetic lip 522, e.g., as illustrated in FIG. 5A.

However, as the NFT 523 is used to heat the magnetic medium, e.g., while performing HAMR, heat is also transferred to the NFT 523 itself and surrounding layers of the head 500, thereby causing them to expand. As mentioned above, the thermo-mechanical response of the NFT when exposed to such high temperatures has previously led to an undesirable protrusion of the plasmonic structure, thereby making the NFT the minimum fly point over the medium during use. This increases the risk of damage to the NFT resulting from disk contact during touchdown and the presence of high thermal asperities during back-off operations. Thus, although minimal clearance (e.g., sub-nanometer clearance) between the head and disk is desired for high areal density in HAMR HDDs, large variations in NFT protrusion during operation has made clearance management for previous attempts significantly difficult.

Previous attempts to protect the NFT against such damage resulting from interaction between the NFT and the medium have significant disadvantages. However, in sharp contrast to previous designs, some of the embodiments described herein are able to reduce NFT protrusion relative to other portions of the writer by selectively implementing underlayers having reduced coefficients of thermal expansion. As a result, the amount of thermal expansion experienced at the media facing surface by the NFT may be selectively reduced, thereby preferably causing the media facing surface at the NFT to exhibits less thermal protrusion toward a magnetic medium than another portion of the media facing surface, as will be described in further detail below.

Referring still to head 500, an underlayer 530 is preferably included at and/or behind the NFT 523 with respect to the media facing surface 501. As will be described in further detail below, the underlayer 530 preferably has one or more materials having a low coefficient of thermal expansion, e.g., at least with respect to that of the fill material 520. Thus, by positioning the underlayer 530 at and/or behind the NFT 523, some of the embodiments may effectively reduce the amount of thermal expansion experienced at and/or near the NFT 523. As a result, this may desirably result in the NFT 523 exhibiting less thermal protrusion toward a magnetic medium than another portion of the media facing surface 501, such as the main pole tip and/or return pole tip.

Underlayer 530 is preferably positioned such that the NFT 523 is at least partially sandwiched between the underlayer 530 and the media facing surface 501. Thus, as shown in FIG. 5A, underlayer 530 is at least partially aligned with, and positioned behind, the NFT 523 with respect to the media facing surface 501. Accordingly, the underlayer 530 may surround at least a portion of the waveguide 506 and/or the cladding layers 508, 510, 512 in some approaches, e.g., as shown in FIG. 5A. However, as mentioned above, the waveguide 506 and/or cladding layers 508, 510, 512 may be offset from the NFT 523 along the track direction (e.g., for embodiments having a nanobeak antenna). Thus the underlayer 530 may be offset from the waveguide 506 and/or the cladding layers 508, 510, 512, such that the underlayer 530 is positioned at and/or behind the NFT 523.

The underlayer 530 may further surround at least a portion of the NFT 523 in some approaches. Thus, at least a portion of the underlayer 530 may extend to the media facing surface 501, e.g., as shown in FIGS. 5A-5B. However, in other embodiments, the underlayer 530 may be slightly offset from the NFT 523 along the height direction H.

Therefore, it should also be noted that although the underlayer 530 is shown in FIG. 5A as extending away from the NFT 523 along the height direction H to the return pole 502 (at the yoke), the underlayer 530 may extend beyond the return pole in some approaches, or may not extend all the way to the return pole 502 in other approaches. The underlayer 530 preferably has a height of less than about 15 microns, e.g., 10 microns, measured in the height direction H. Moreover, the underlayer 530 may have a width of less than about 2 microns, e.g., 1 micron, measured in a direction perpendicular to a plane formed by the intended direction of media travel and the height direction. The underlayer 530 also preferably has a thickness of less than about 5 microns, more preferably less than about 4 microns, e.g., 2 microns, measured along the track direction T, but may be thicker depending on the desired embodiment. For example, portions the underlayer 530 may have a thickness of greater than 5 microns in embodiments having a waveguide and/or cladding layers offset from the NFT, such as in embodiments having a nanobeak antenna. Moreover, the underlayer 530 may be formed using sputtering, masking, milling, etc., or other conventional processes which would be apparent to one skilled in the art upon reading the present description.

As shown in the present embodiment, fill material 520 has been deposited such that it surrounds a number of components of the head 500, including the write coils 518. Additionally, fill material 520 is positioned in a space defined between the return pole 502 and the main pole 504. Thus, the fill material 520 may at least partially surround the underlayer 530, the waveguide 506 and cladding layers 508, 510, 512.

As described above, the underlayer 530 preferably has a lower coefficient of thermal expansion than the fill material 520. Thus, during operation of the head 500, the underlayer 530 will expand less than the fill material 520, thereby preferably causing the media facing surface 501 at the NFT 523 to exhibit less thermal protrusion toward a magnetic medium 528 than another portion of the media facing surface 501, e.g., affected by the higher amount of thermal expansion experienced by the fill material 520. As a result, the reduced thermal expansion experienced by the underlayer 530 prevents the NFT 523 from becoming the minimum fly point over the medium during operation, thereby desirably providing greater reliability during recording. Again, it is preferred that the underlayer 530 is positioned at and/or behind the NFT 523. In other words, it is preferred that the underlayer 530 is present in an NFT region which at least partially surrounds the NFT 523 and/or extends behind the NFT 523 in the height direction H.

The inventors also discovered that implementing an underlayer 530 having a higher thermal conductivity than that of the fill material 520 may provide additional performance improvements. Materials having higher thermal conductivity are able to better dissipate the heat, thereby allowing underlayer 530 to more effectively diffuse the heat generated at the NFT 523 during use, and further reduce the amount of thermal protrusion experienced by the media facing surface 501 at about the NFT 523.

According to an exemplary approach, fill material 520 may include alumina and/or other conventional insulation materials. Moreover, depending on the desired embodiment, underlayer 530 preferably includes one or more materials having a low coefficient of thermal expansion, such as fused silica (e.g., amorphous fused silica), aluminum nitride, silicon nitride, silicon carbide, etc. Underlayer 530 also preferably has a higher coefficient of thermal conductivity than that of the fill material 520, e.g., which may be alumina. Table 1 below illustrates the difference between the coefficient of thermal expansion for alumina compared to that of exemplary underlayer materials. The coefficient of thermal conductivity is also shown for each of the respective materials.

TABLE 1

| Underlayer Material | Thermal Expansion $10^{-6}/°$ C. | Thermal Conductivity W/m · °K |
|---|---|---|
| Alumina (Al2O3) | 8.1 | 18 |
| Fused Silica (SiO2) | 0.55 | 1.38 |
| Aluminum Nitride (AlN) | 4.5 | 140-180 |
| Silicon Nitride (SiN) | 3.3 | 30 |
| Silicon Carbide (SiC) | 4.0 | 120 |

As shown, the coefficient of thermal expansion for alumina is much higher than each of the coefficients of thermal expansion for fused silica, aluminum nitride, silicon nitride and silicon carbide respectively, thereby illustrating the difference in thermal expansion experienced by the different materials. Additionally, the thermal conductivity coefficient of aluminum nitride, silicon nitride and silicon carbide is greater than that of alumina, thereby providing a greater amount of heat dispersion than alumina. It should also be noted that the specific underlayer materials listed herein are in no way intended to limit the invention.

Figure 6:
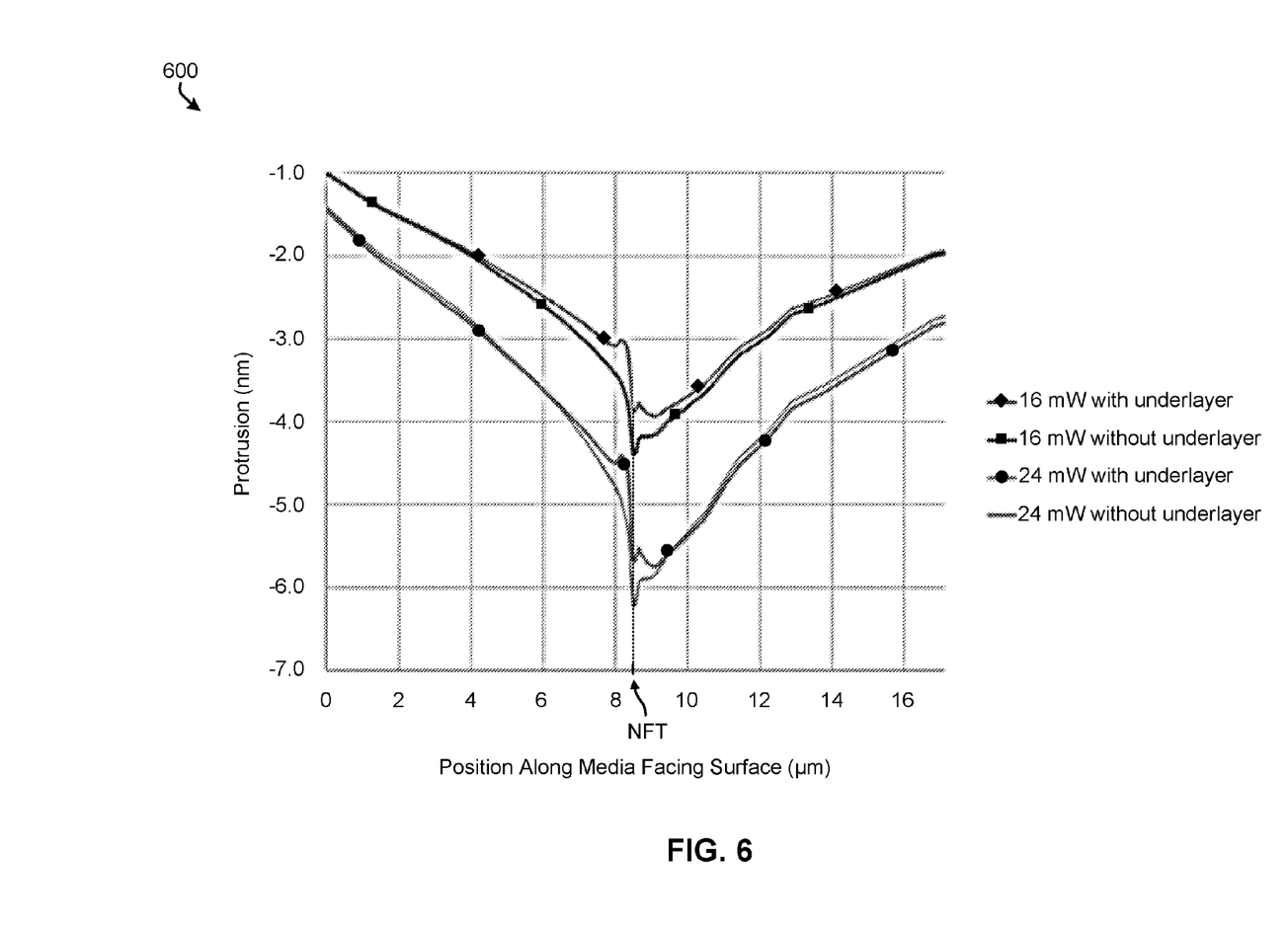
FIG. 6 is a graph of the thermal protrusion experienced across the media facing surfaces of magnetic heads according to different embodiments.

Looking to FIG. 6, a graph 600 illustrates the thermal protrusion experienced at different points along media facing surfaces of two different magnetic heads at different laser energy levels. It should be noted that the results illustrated in graph 600 were gathered from modeling and are in no way intended to limit the invention.

As shown, the maximum protrusion, which directly corresponds to the minimum fly point over the medium, for a magnetic head without an underlayer and exposed to 16 mW is at the NFT. In other words, the maximum amount of thermal protrusion experienced by the media facing surface of the magnetic head without an underlayer is undesirably at the NFT. Conversely, after adding an underlayer having fused silica, the minimum fly point for the magnetic head shifts to a different portion of the media facing surface when exposed to the same energy level of 16 mW. In other words, adding a fused silica underlayer caused the NFT to protrude less, and thereby be recessed with respect to a different portion of the media facing surface experiencing a greater amount of thermal expansion, e.g., caused by the fill material having a higher coefficient of thermal expansion than the underlayer. As a result, the NFT is protected from damage during use, e.g., while writing to a magnetic medium.

Moreover, similar results were obtained when modeling the exposure of the same two head designs to a higher energy level of 24 mW. It follows that by implementing an underlayer having a coefficient of thermal expansion which is lower than a surrounding fill material, the NFT remains protected under a range of operating conditions, e.g., light energy levels. Operating temperatures of the NFT and surrounding materials may vary greatly during use, and various embodiments described herein desirably ensure continued protection for the NFT despite such fluctuations in operating temperatures, which was not previously achievable, e.g., by pre-recessing the NFT region of the media facing surface.

Although preventing the NFT from becoming the minimum fly point over the medium during operation is desired to avoid head-disk interference (HDI), it is also preferred that the NFT does not become over recessed from the medium. As the NFT is moved farther away from the medium, the NFT has less of an effect on the magnetic medium as there is more separation between the NFT and the target (the focused spot on the medium). Thus, the protection afforded by recessing the NFT from the minimum fly point may be weighed against the corresponding loss of write detail when determining a desired amount of separation between the NFT and the medium. However, it is preferred that the NFT 523 is at least recessed enough to prevent it from becoming the minimum fly point over the medium during operation.

According to an exemplary in-use embodiment of the magnetic head 500 having an underlayer structure which is at least partially surrounded by fill material in FIG. 5, which is in no way intended to limit the invention, light (e.g., an optical signal) may be applied to the NFT 523 positioned toward a media facing surface 501 of the magnetic head 500. The light may originate from the optical source 516 (e.g., a laser) which desirably emits the light such that it is directed along the optical waveguide 506, toward the NFT 523.

As a result of being illuminated by the light delivered by the waveguide 506, the NFT 523 creates a small hot-spot on the surface of the magnetic medium 528, thereby inducing isolated heating of the medium 528 surface. However, the NFT 523 itself and surrounding materials are also heated by the light energy during operation, thereby leading to protrusion of the media facing surface 501 as a result of thermal expansion. Underlayer 530 helps disperse heat away from the NFT 523 while also minimizing the amount of thermal expansion experienced by the media facing surface 501 at the NFT 523.

It follows that various embodiments described herein may be able to provide added protection for an NFT during operation. By optimizing the size and material properties of one or more underlayer positioned at and/or behind the NFT, protrusion thereof at the media facing surface may be selectively reduced. Moreover, reducing the amount of thermal expansion experienced at about the NFT prevents the NFT from becoming the minimum fly point over the medium during operation, thereby desirably providing greater reliability during recording. Furthermore, implementing materials having increased thermal conductivity at and/or behind the NFT may further improve performance of a magnetic head.

Moreover, any of the approaches described and/or suggested herein may be implemented in embodiments having nanobeak antenna configurations of types known in the art. Thus, process flow(s) similar to and/or the same as any of the embodiments included herein may produce desirable performance results for nanobeak antennas. Further still, various approaches described and/or suggested herein may be implemented in embodiments having front and/or back edge profiles of an NFT antenna which are different than that of a magnetic pole.

It should be noted that methodology presented herein for at least some of the various embodiments may be implemented, in whole or in part, in computer hardware, software, by hand, using specialty equipment, etc. and combinations thereof.

Moreover, any of the dimensions described herein with regard to any of the FIGS. and/or any other embodiment thereof, may be higher or lower than the values listed, depending on the particular sizes and shapes of components in such particular embodiments.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
   a near field transducer;
   a return pole;
   a main pole;
   a waveguide adjacent the near field transducer, wherein the waveguide extends away from the near field transducer along a direction perpendicular to a media facing surface;
   at least one cladding layer adjacent to the waveguide;
   an underlayer positioned behind the near field transducer with respect to the media facing surface, the underlayer extending away from the near field transducer along the direction perpendicular to the media facing surface; and
   a fill material at least partially surrounding the underlayer, the waveguide and the at least one cladding layer,
   wherein the underlayer has a lower coefficient of thermal expansion than the fill material and the underlayer surrounds at least a portion of the waveguide and the at least one cladding layer.

2. The system as recited in claim 1, wherein the underlayer surrounds at least a portion of the near field transducer.

3. The system as recited in claim 2, wherein at least a portion of the underlayer extends to the media facing surface.

4. The system as recited in claim 1, wherein the fill material is positioned in a space defined between the return pole and the main pole.

5. The system as recited in claim 1, wherein the underlayer has a higher thermal conductivity than the fill material.

6. The system as recited in claim 1, wherein the fill material includes alumina.

7. The system as recited in claim 1, wherein the underlayer includes at least one of:
   fused silica, aluminum nitride, silicone nitride and silicon carbide.

8. The system as recited in claim 1, wherein the near field transducer is part of an antenna.

9. The system as recited in claim 8, wherein the antenna is selected from a group consisting of: an E-antenna, a nanobeak antenna and a lollipop antenna.

10. The system as recited in claim 9, wherein the antenna is an E-antenna.

11. A magnetic data storage system, comprising:
    at least one magnetic head having the near field transducer, the underlayer and the fill material as recited in claim 1;
    a magnetic medium;
    a drive mechanism for passing the magnetic medium over the at least one magnetic head; and
    a controller electrically coupled to the at least one magnetic head for controlling operation of the at least one magnetic head.

12. A method, comprising:
    applying light to a near field transducer positioned toward a media facing surface of a magnetic head, the magnetic head having:
       a return pole;
       a main pole;
       a waveguide adjacent the near field transducer, wherein the waveguide extends away from the near field transducer along a direction perpendicular to the media facing surface;
       at least one cladding layer adjacent to the waveguide;
       an underlayer positioned behind the near field transducer with respect to the media facing surface, the underlayer extending away from the near field transducer along the direction perpendicular to the media facing surface; and
       a fill material at least partially surrounding the underlayer, waveguide and the at least one cladding layer,
    wherein the underlayer has a lower coefficient of thermal expansion than the fill material and the underlayer surrounds at least a portion of the waveguide and the at least one cladding layer,
    wherein upon illumination of the near field transducer, a portion of the media facing surface of the magnetic head at the near field transducer exhibits less thermal protrusion toward a magnetic medium than another portion of the media facing surface.

13. The method as recited in claim 12, wherein the underlayer surrounds at least a portion of the near field transducer.

14. The method as recited in claim 12, wherein at least a portion of the underlayer extends to the media facing surface.

15. The method as credited in claim 12, wherein the fill material is positioned in a space defined between the return pole and the main pole.

16. The method as recited in claim 12 wherein the underlayer has a higher thermal conductivity than the fill material.

17. The method as recited in claim 12, wherein the fill material includes alumina.

18. The method as recited in claim 12, wherein the underlayer includes at least one of: fused silica, aluminum nitride, silicon nitride and silicon carbide.

* * * * *